US012080499B2

(12) United States Patent
Shanbhag et al.

(10) Patent No.: US 12,080,499 B2
(45) Date of Patent: Sep. 3, 2024

(54) CONTACTOR WITH MOVABLE CONTACT

(71) Applicants: TE Connectivity Solutions GmbH, Schaffhausen (CH); TE CONNECTIVITY INDIA PRIVATE LIMITED, Bangalore (IN); TE CONNECTIVITY BRASIL INDUSTRIA DE ELECTRONICOS LTDA, Braganca Paulista (BR)

(72) Inventors: Raghunandan S. Shanbhag, Bangalore (IN); Rakshit R. Baliga, Bangalore (IN); Xiaobao Geng, Troy, MI (US); Amadeu Luiz Fazani Cavallieri, Sao Paulo (BR)

(73) Assignees: TE Connectivity Solutions GmbH-CH; TE Connectivity Brasil Industria De Electronicos Ltda.-BR (BR); TE Connectivity India Private Limited (IN)

(*) Notice: Subject to any disclaimer, the term of this patent is extended or adjusted under 35 U.S.C. 154(b) by 143 days.

(21) Appl. No.: 17/713,259

(22) Filed: Apr. 5, 2022

(65) Prior Publication Data

US 2023/0223227 A1 Jul. 13, 2023

(51) Int. Cl.

| | |
|---|---|
| ***H01H 50/20*** | (2006.01) |
| ***H01H 50/02*** | (2006.01) |
| ***H01H 50/44*** | (2006.01) |
| ***H01H 50/58*** | (2006.01) |
| ***H01H 50/64*** | (2006.01) |

(52) U.S. Cl.
CPC ............ *H01H 50/20* (2013.01); *H01H 50/02* (2013.01); *H01H 50/44* (2013.01); *H01H 50/64* (2013.01); *H01H 50/58* (2013.01)

(58) Field of Classification Search
CPC ........ H01H 50/20; H01H 50/02; H01H 50/44; H01H 50/64; H01H 50/58
See application file for complete search history.

(56) References Cited

U.S. PATENT DOCUMENTS

| | | | | |
|---|---|---|---|---|
| 5,638,038 | A * | 6/1997 | Suzuki | H01H 71/405 335/35 |
| 6,300,854 | B1 * | 10/2001 | Oberndorfer | H01H 50/548 200/275 |
| 10,134,551 | B2 * | 11/2018 | Potter | H01H 49/00 |
| 2015/0077202 | A1 * | 3/2015 | Enomoto | H01H 1/54 335/171 |
| 2018/0166244 | A1 * | 6/2018 | Kobayashi | H01H 50/54 |
| 2019/0108958 | A1 * | 4/2019 | Sprague | H01H 1/2075 |

* cited by examiner

*Primary Examiner* — Bernard Rojas

(57) ABSTRACT

A contactor includes a housing and first and second fixed contacts coupling to the housing having mating ends received in the cavity of the housing and terminating ends outside of the housing. A movable contact is movable within the cavity between a mated position and an unmated position that engages the mating end of the second fixed contact in the mated position and is separated from the second fixed contact in the unmated position. A flexible busbar is coupled to the first mating end and coupled to the movable contact. The flexible busbar electrically connects the first fixed contact and the movable contact in both the mated position and the unmated position. A coil assembly in the cavity operates to move the movable contact between the unmated position and the mating position.

22 Claims, 9 Drawing Sheets

CONTACTOR WITH MOVABLE CONTACT

CROSS REFERENCE TO RELATED APPLICATIONS

This application claims benefit to Indian Application No. 202241000915, filed 7 Jan. 2022, the subject matter of which is herein incorporated by reference in its entirety.

BACKGROUND OF THE INVENTION

The subject matter herein relates generally to high power electrical contactors.

Certain electrical applications, such as HVAC, power supply, locomotives, elevator control, motor control, aerospace applications, hybrid electric vehicles, fuel-cell vehicles, charging systems, and the like, utilize electrical contactors having contacts that are normally open (or separated). The contacts are closed (or joined) to supply power to a particular device. When the contactor receives an electrical signal, the contactor is energized to introduce a magnetic field to drive a movable contact to mate with fixed contacts. During mating and unmating of the movable contact with the fixed contacts, electrical arcing may occur, which may cause damage to the contacts, such as oxidation of the surfaces of the contacts, leading to failure of the contactor over time. Additionally, contact resistance is high at the interfaces between the fixed contacts and the movable contact. In some high power applications, magnetic forces may cause the movable contact to tend to separate from the fixed contacts, leading to vibration and noise that is undesirable.

A need exists for a contactor that overcomes the above problems and addresses other concerns experienced in the prior art.

BRIEF DESCRIPTION OF THE INVENTION

In one embodiment, a contactor is provided and includes a housing having an outer wall defining a cavity. A contactor is provided and includes a first fixed contact coupling to the housing. The first fixed contact has a first mating end that is received in the cavity and a first terminating end outside of the housing. A contactor is provided and includes a second fixed contact coupled to the housing. The second fixed contact has a second mating end that is received in the cavity and a second terminating end outside of the housing. A contactor is provided and includes a movable contact movable within the cavity between a mated position and an unmated position. The movable contact engages the second mating end in the mated position. The movable contact is separated from the second fixed contact in the unmated position. A contactor is provided and includes a flexible busbar coupled to the first mating end and coupled to the movable contact. The flexible busbar electrically connects the first fixed contact and the movable contact in both the mated position and the unmated position. A coil assembly in the cavity operates to move the movable contact between the unmated position and the mating position.

In another embodiment, a contactor is provided and includes a housing having an outer wall defining a cavity. A contactor is provided and includes a first fixed contact coupling to the housing. The first fixed contact has a first mating end that is received in the cavity and a first terminating end outside of the housing. A contactor is provided and includes a second fixed contact coupled to the housing. The second fixed contact has a second mating end that is received in the cavity and a second terminating end outside of the housing. The second mating end has a mating tab. The second fixed contact has a first mating tab pad and a second mating tab pad spaced apart from the first mating tab pad. A contactor is provided and includes a movable contact movable within the cavity between a mated position and an unmated position. The movable contact is separated from the second fixed contact in the unmated position. The movable contact engages the first and second mating tab pads of the second fixed contact in the mated position to create a first electrical path between the first and second mating tab pads through the movable contact and a second electrical path between the first and second mating tab pads through the second fixed contact. A contactor is provided and includes a coil assembly in the cavity that operates to move the movable contact between the unmated position and the mating position.

In a further embodiment, a contactor is provided and includes a housing having an outer wall defining a cavity. A contactor is provided and includes a first fixed contact that is coupled to the housing. The first fixed contact has a first mating end that is received in the cavity and a first terminating end outside of the housing. A contactor is provided and includes a second fixed contact coupling to the housing. The second fixed contact has a second mating end received in the cavity and a second terminating end outside of the housing. A contactor is provided and includes a contact holder received in the cavity. The contact holder holds the first and second fixed contacts within the housing. The contact holder includes a first holder element and a second holder element meeting at a seam. The first and second fixed contacts pass through the contact holder at the seam such that both the first and second holder elements engage and support the first and second fixed contacts. A contactor is provided and includes a movable contact movable within the cavity between a mated position and an unmated position. The movable contact electrically connects the first and second fixed contacts in the mated position. The movable contact separates from the second fixed contact in the unmated position; and a coil assembly in the cavity operates to move the movable contact between the unmated position and the mating position.

DETAILED DESCRIPTION OF THE INVENTION

Figure 1:
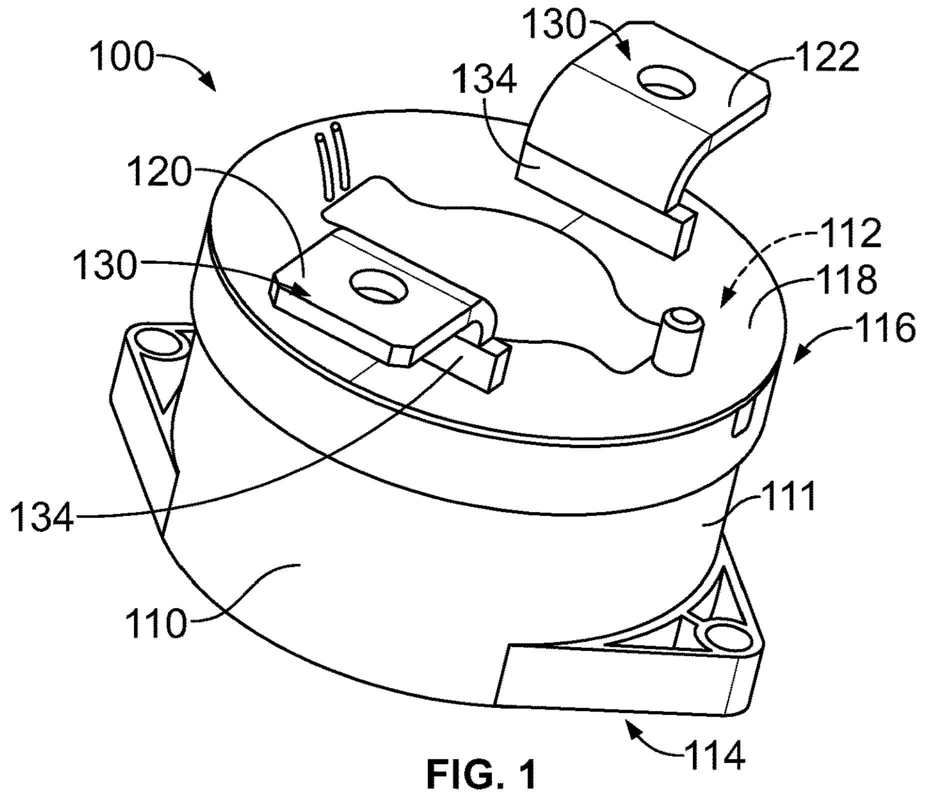
FIG. 1 illustrates a contactor in accordance with an exemplary embodiment.
Figure 2:
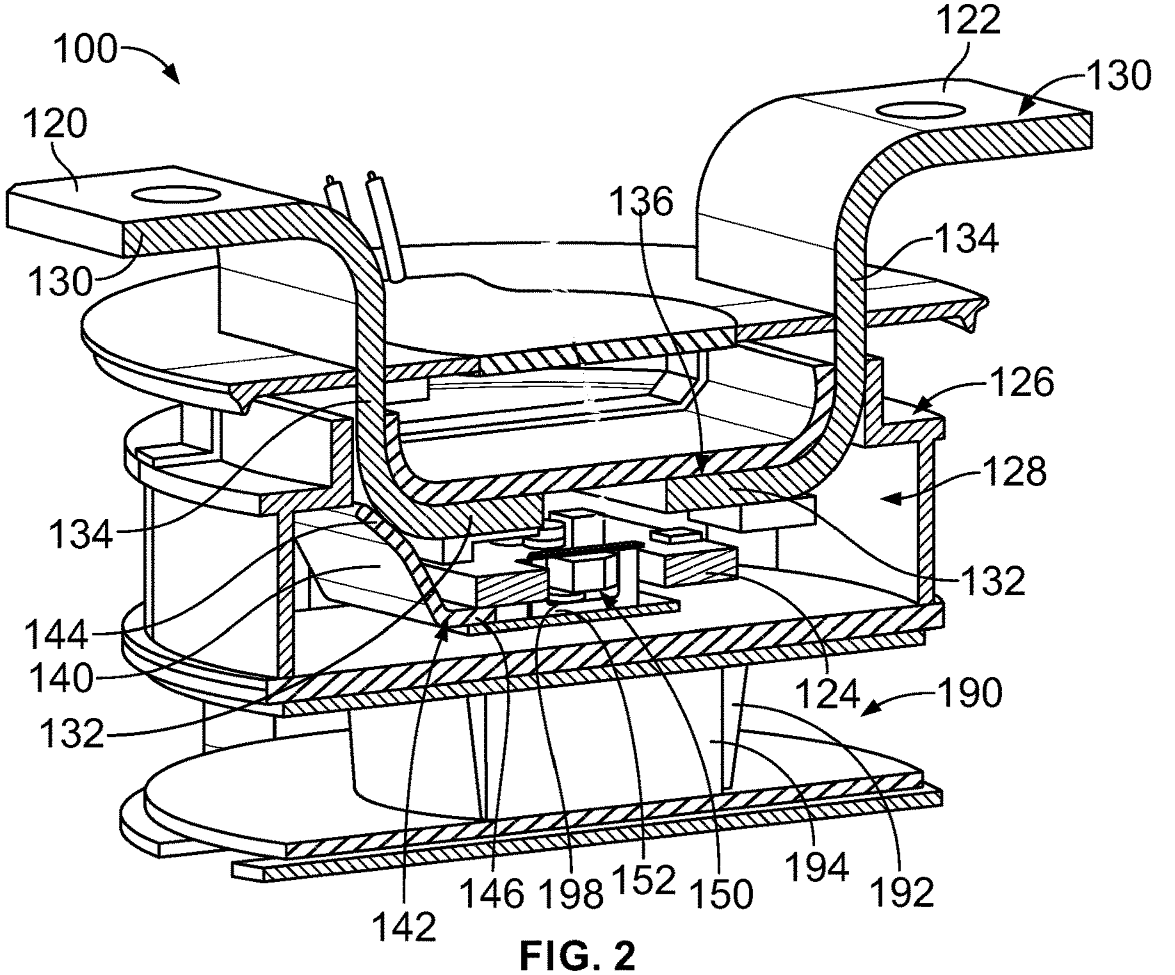
FIG. 2 is a sectional view of the contactor in accordance with an exemplary embodiment.

FIG. 1 illustrates a contactor 100 in accordance with an exemplary embodiment. FIG. 2 is a sectional view of the contactor 100 in accordance with an exemplary embodiment illustrating internal components of the contactor 100. The contactor 100 is an electrical switch or relay that safely connects and disconnects one or more electrical circuits to protect the flow of power through the system. The contactor 100 may be used in various applications such as HVAC, power supply, locomotives, elevator control, motor control, aerospace applications, hybrid electric vehicles, fuel-cell vehicles, charging systems, and the like.

The contactor 100 includes a housing 110 (removed in FIG. 2 to illustrate the internal components of the contactor 100) having an outer wall 111 surrounding a cavity 112. The housing 110 may be a multi-piece housing in various embodiments. The housing 110 includes a base 114 and a header 116 extending from the base 114. Optionally, the base 114 may be configured to be coupled to another component. For example, the base 114 may include mounting brackets for securing the contactor 100 to the other component. In the illustrated embodiment, the base 114 is provided at a bottom of the contactor 100 and the header 116 is located above the base 114; however, the housing 110 may have other orientations in alternative embodiments. The housing 110 includes a cover 118 (FIG. 1) for closing the cavity 112. For example, the cover 118 may be coupled to the top of the header 116. Optionally, the cover 118 may be sealed to the header 116. The outer wall 111 along the header 116 may be cylindrical defining a cylindrical cavity 112 in various embodiments. The cavity 112 may be at least partially filled with epoxy for sealing the housing 110 and internal components.

The contactor 100 includes first and second fixed contacts 120, 122, 122 received in the cavity 112 and a movable contact 124 movable within the cavity 112 between a mated position and an unmated position. The movable contact 124 electrically connects the fixed contacts 120, 122 in the mated position. The fixed contacts 120, 122 are fixed to the housing 110. For example, the fixed contacts 120, 122 may be coupled to the header 116 and/or the cover 118. In an exemplary embodiment, a contact holder 126 is used to hold the fixed contacts 120, 122. The contact holder 126 is received in the cavity 112 and coupled to the housing 110. The contact holder 126 may be removable from the cavity 112 when the cover 118 is removed from the header 116. The contact holder 126 defines an enclosure 128. The fixed contacts 120, 122 extend into the enclosure 128. The movable contact 124 is located in the enclosure 128. The outer wall 111 surrounds the enclosure 128.

The fixed contacts 120, 122 each include an outer end defining a terminating end 130 and an inner end defining a mating end 132. The fixed contacts 120, 122 each have a transition portion 134 with one or more bends 136. In the illustrated embodiment, the fixed contacts 120, 122 are S-shaped having the terminating end 130 parallel to the mating end 132. Other shapes are possible in alternative embodiments. The terminating end 130 is configured to be terminated to another component, such as a wire or a terminal, such as a line in or a line out wire. In an exemplary embodiment, the terminating end 130 is exposed at the exterior of the contactor 100 for terminating to the other component. The terminating end 130 may be threaded to receive a nut. In the illustrated embodiment, the terminating end 130 extends through the cover 118 and is located above the cover 118. The mating end 132 is located within the cavity 112 for connection with the movable contact 124, such as when the contactor 100 is energized. In the illustrated embodiment, the mating end 132 is generally flat or planar, such as for engaging the movable contact 124. However, the mating end 132 may have other shapes in alternative embodiments.

In an exemplary embodiment, the contactor 100 includes a flexible busbar 140 electrically connecting the first fixed contact 120 and the movable contact 124. The flexible busbar 140 flexes as the movable contact 124 moves between the mated position and the unmated position. In an exemplary embodiment, the flexible busbar 140 includes a flexible braid 142 having braided conductors. A first mating end 144 of the flexible busbar 140 is connected to the first fixed contact 120. A second mating end 146 of the flexible busbar 140 is connected to the movable contact 124. The first and second mating ends 144, 146 may be welded to the first fixed contact 120 and the movable contact 124, respectively. The movable contact 124 remains connected to the first fixed contact 120 through the flexible busbar 140 as the movable contact 124 moves between the mated position and the unmated position.

The contactor 100 includes a coil assembly 190 in the cavity 112 operated to move the movable contact 124 between the unmated position and the mated position. The coil assembly 190 includes a winding or coil 192 wound around a core 194 to form an electromagnetic field. The coil assembly 190 includes a plunger (not shown) coupled to the core 194. The movable contact 124 is coupled to the plunger and is movable with the plunger when the coil assembly 190 is operated. The coil assembly 190 includes a spring 198 for returning the movable contact 124 to the unmated position when the coil assembly 190 is deenergized. Optionally, the contactor 100 may include an arc suppressor (not shown) for suppressing electrical arc of the electrical circuit. The arc suppressor may be located in the cavity 112 of the housing 110. In an exemplary embodiment, the arc suppressor includes magnets creating magnetic fields in the enclosure 128 for suppressing arc created between the movable contact 124 and the fixed contacts 120, 122. In an exemplary embodiment, the contact holder 126 may be sealed, such as using epoxy, and may be filled with an inert gas for arc suppression.

Figure 3:
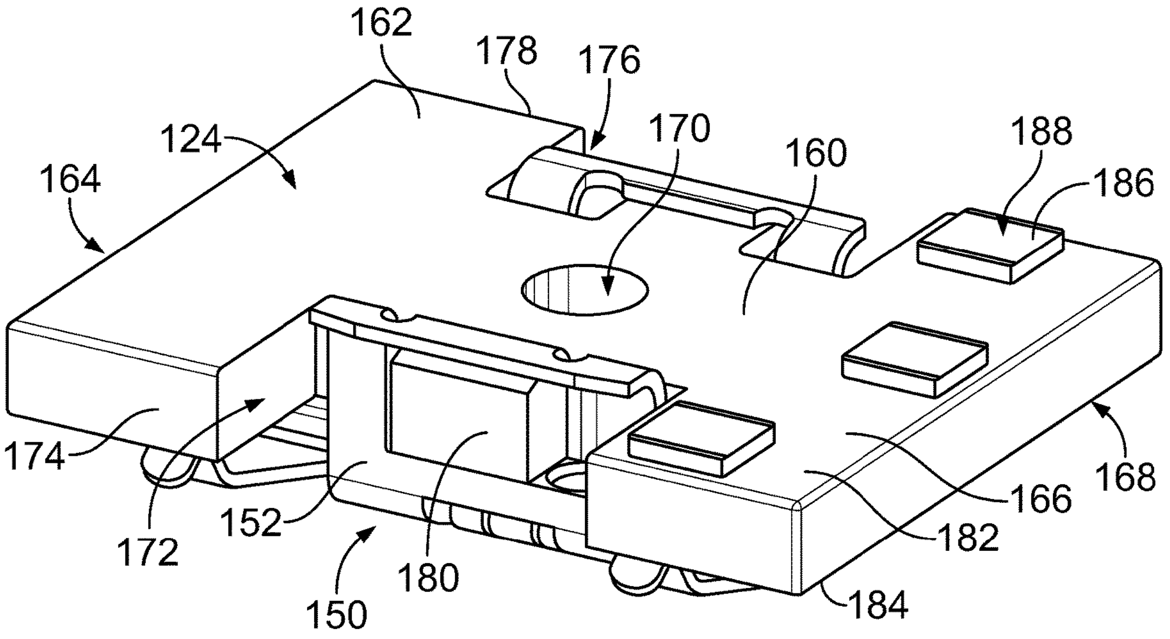
FIG. 3 is a top perspective view of a movable contact assembly in accordance with an exemplary embodiment.

FIG. 3 is a top perspective view of a movable contact assembly 150 in accordance with an exemplary embodiment. The movable contact assembly 150 includes the movable contact 124 and a movable contact holder 152. The movable contact holder 152 is used to position the movable contact 124 in the housing 110 of the contactor 100 (shown in FIG. 2). For example, the movable contact holder 152 may hold the movable contact 124 in a planar orientation, such as a horizontal orientation, as the movable contact 124 moves within the housing 110.

The movable contact 124 is manufactured from a conductive material, such as a metal material. The movable contact 124 may be stamped or cut into a predetermined size and shape, which may affect the amount of current passing through the movable contact 124 and the amount of electrical resistance for the current transferred through the movable contact 124. The movable contact 124 includes a main body 160 having a first plate 162 at a first end 164 of the movable contact 124 and a second plate 166 at a second end 168 of the movable contact 124. The movable contact 124 include an opening 170 in the main body 160. The opening 170 may be coupled to the coil assembly 190, such as the plunger. The movable contact 124 includes a first pocket 172 along a first side 174 of the movable contact 124 and a second pocket 176 along a second side 178 of the movable contact 124. The movable contact 124 includes mounting tabs 180 extending into the pockets 172, 176. The movable contact holder 152 is coupled to the mounting tabs 180 at the first and second sides 174, 178. In the illustrated embodiment, the movable contact 124 is I-shaped, wherein the movable contact 124 is wider (between the sides 174, 178) at the first and second plates 162, 166 and narrower along the central portion of the main body 160. The plates 162, 166 provide greater surface area for mating with the flexible busbar 140 and the second fixed contact 122 (shown in FIG. 2). The movable contact 124 may have other shapes in alternative embodiments, such as a rectangular shape having a constant width.

The movable contact 124 includes an upper surface 182 and a lower surface 184. In an exemplary embodiment, the flexible busbar 140 is coupled to the lower surface 184 of the first plate 162 at the first end 164. However, the flexible busbar 140 may be coupled to the upper surface 182 in alternative embodiments. In an exemplary embodiment, the movable contact 124 includes mating contact pads 186 at the upper surface 182 along the second plate 166 at the second end 168. The mating contact pads 186 are configured to be mated to and unmated from the second fixed contact 122. Each mating contact pad 186 includes a mating interface 188 forming the point of contact with the second fixed contact 122. Electrical paths are created between the movable contact 124 and the second fixed contact 122 through the mating contact pads 186. In the illustrated embodiment, the mating interfaces 188 are generally planar. However, the mating contact pads 186 may have other shapes in alternative embodiments, such as being bumps having a convex shape. In an exemplary embodiment, the movable contact 124 includes three of the mating contact pads 186 arranged in a triangular orientation. Greater or fewer mating contact pads 186 may be provided in alternative embodiments. The mating contact pads 186 may be arranged in a different orientation in alternative embodiments. In an exemplary embodiment, the mating contact pads 186 may be located adjacent the perimeter of the movable contact 124, such as at the first and second sides 174, 178 and at the second end 168, such as to increase the spacing between the mating contact pads 186.

Figure 4:
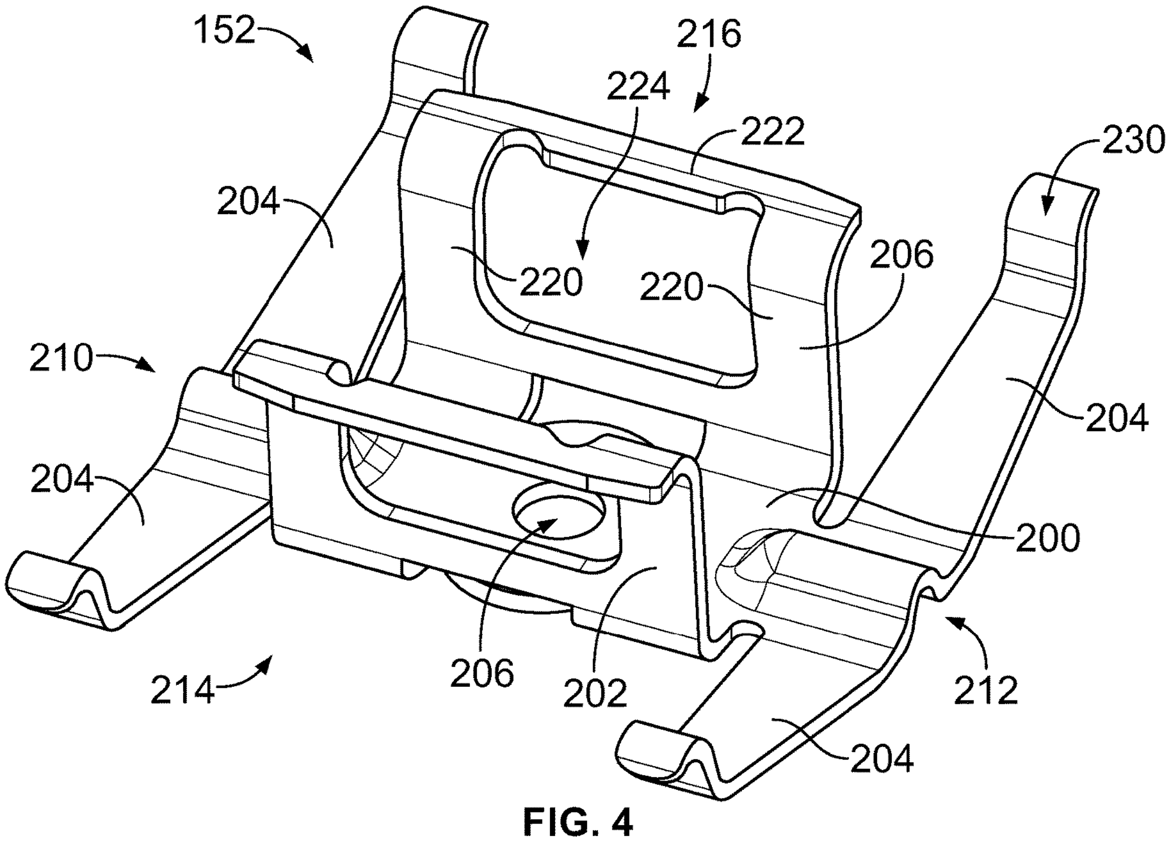
FIG. 4 is a top perspective view of the movable contact holder in accordance with an exemplary embodiment.

FIG. 4 is a top perspective view of the movable contact holder 152 in accordance with an exemplary embodiment. In an exemplary embodiment, the movable contact holder 152 is a stamped and formed part. The movable contact holder 152 may be coupled to the coil assembly 190, such as the plunger, to position the movable contact 124 as the movable contact 124 is moved between the mated position and the unmated position.

The movable contact holder 152 includes a base 200, mounting arms 202 extending from the base 200, and support arms 204 extending from the base 200. The mounting arms 202 are used to secure the movable contact holder 152 to the movable contact 124. The support arms 204 are used to position the movable contact 124 within the housing 110 of the contactor 100 (shown in FIG. 2) during mating and unmating.

The base 200 is provided at the bottom of the movable contact holder 152. The base 200 includes an opening 206, which may receive the plunger. The base 200 extends between a first end 210 and a second end 212. The base 200 extends between a first side 214 and a second side 216. In the illustrated embodiment, the movable contact holder 152 includes a pair of the mounting arms 202 provided at the opposite sides 214, 216. The mounting arms 202 are configured to engage the movable contact 124 at the center of the main body 160 of the movable contact 124. In the illustrated embodiment, the movable contact holder 152 includes four of the support arms 204 provided at the opposite ends 210, 212 and the opposite sides 214, 216. The support arms 204 are configured to engage the movable contact 124 at the four corners of the movable contact 124.

In an exemplary embodiment, each mounting arms 202 includes side walls 220 and a top wall 222 extending between the side walls 220. The mounting arms 202 includes an opening 224 are surrounded by the side walls 220 and the top wall 222. The opening 224 is configured to receive the mounting tabs 180 (shown in FIG. 3). The mounting arms 202 are configured to be clipped onto the movable contact 124. Other types of mounting features may be used in alternative embodiments.

In an exemplary embodiment, the support arms 204 are cantilevered from the base 200. Each support arm 204 extends from the base 200 to a tip 230 at the distal end of the support arm 204. The tip 230 is configured to engage the lower surface of the movable contact 124. Optionally, the support arm 204 may be curved at the tip 230. In an exemplary embodiment, the support arms 204 are deflectable and configured to be spring biased against the movable contact 124 to hold the movable contact 124 in a particular orientation, such as a horizontal orientation.

Returning to FIG. 3, FIG. 3 illustrates the movable contact holder 152 coupled to the movable contact 124. The mounting arms 202 are secured to the mounting tabs 180 at the first and second sides 174, 178 of the movable contact 124. The support arms 204 are located outward of the mounting arms 202. The support arms 204 engage the lower surface 184 of the movable contact 124 to press upward against the lower surface 184. In an exemplary embodiment, the support arms 204 engage the movable contact 124 proximate to the first and second ends 164, 168 and proximate to the first and second sides 174, 178. For example, the support arms 204 may engage the movable contact 124 proximate to the four outer corners of the movable contact 124. The support arms 204 of the movable contact 124 and a horizontal orientation as the movable contact 124 moves between the mated position and the unmated position.

Figure 5:
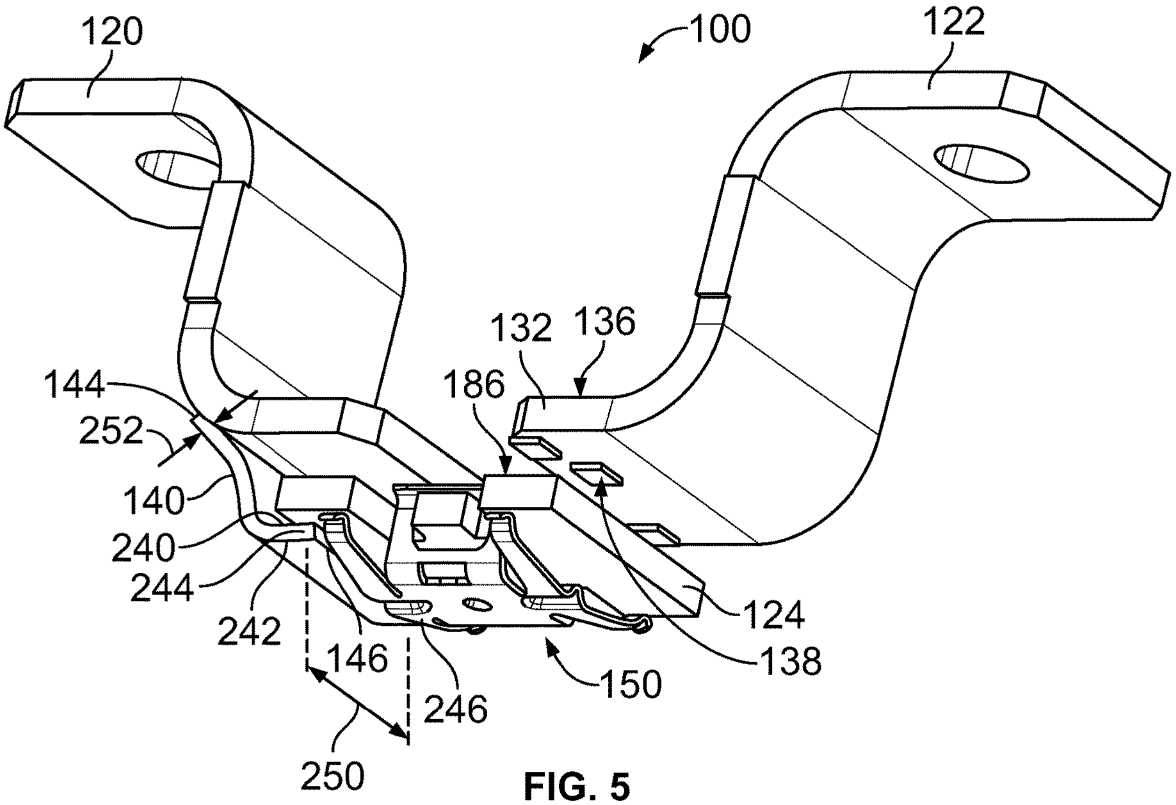
FIG. 5 is a bottom perspective view of a portion of the contactor showing the movable contact assembly in an unmated position relative to the fixed contacts with an exemplary embodiment.

FIG. 5 is a bottom perspective view of a portion of the contactor 100 showing the movable contact assembly 150 in an unmated position relative to the fixed contacts 120, 122.

FIG. 5 illustrates the flexible busbar 140 between the first fixed contact 120 and the movable contact 124. The movable contact 124 is unmated from the second fixed contact 122.

In an exemplary embodiment, the second fixed contact 122 includes a mating tab 136 at the mating end 132. The mating tab 136 is oriented parallel to the movable contact 124. For example, the mating tab 136 may be oriented horizontally. The second fixed contact 122 includes one or more mating tab pads 138 at a bottom of the mating tab 136. The mating tab pads 138 are configured to be mated to and unmated from the mating contact pads 186 of the movable contact 124. Each mating tab pad 138 includes a mating interface forming the point of contact with the corresponding mating contact pad 186. Electrical paths are created between the movable contact 124 and the second fixed contact 122 through the mating contact pads 186 and the mating tab pads 138. Providing multiple mating contact pads 186 and mating tab pads 138 creates multiple points of contact and multiple electrical paths through the second fixed contact 122 and the movable contact 124. For example, parallel electrical paths may be created, such as a first electrical path through the second fixed contact 122 and a second electrical path through the movable contact 124. The parallel electrical paths generate a magnetically attractive force, which tends to hold the movable contact 124 in the mated position and reduces the risk of undesirable separation or vibrations in the contacts. In the illustrated embodiment, the mating interfaces are generally planar. However, the mating tab pads 138 may have other shapes in alternative embodiments, such as being bumps having a convex shape.

In an exemplary embodiment, the second fixed contact 122 includes three of the mating tab pads 138 arranged in a triangular orientation. Greater or fewer mating tab pads 138 may be provided in alternative embodiments. The mating tab pads 138 may be arranged in a different orientation in alternative embodiments. In an exemplary embodiment, the mating tab pads 138 may be located adjacent the edges of the second fixed contact 122, such as at the opposite sides and at the end, such as to increase the spacing between the mating tab pads 138.

When the movable contact 124 is in the unmated position, the movable contact pads 186 are spaced apart from the mating tab pads 138. The movable contact pads 186 and the mating tab pads 138 define a separable interface between the movable contact 124 and the second fixed contact 122. However, the movable contact 124 remains electrically connected to the first fixed contact 120 through the flexible busbar 140. The flexible busbar 140 forms a permanent connection between the movable contact 124 and the first fixed contact 120. The flexible busbar 140 is connected to the movable contact 124 and the first fixed contact 120 in the mated position and the flexible busbar 140 is connected to the movable contact 124 and the first fixed contact 120 in the unmated position.

In an exemplary embodiment, the flexible busbar 140 has a generally rectangular cross-section. For example, the flexible busbar 140 is plate-like or sheet-like having an upper surface 240 and a lower surface 242 extending between first and second sides 244, 246. The sides 244, 246 extend between the first and second mating ends 144, 146. The flexible busbar 140 has a length 248 between the mating ends 144, 146 and a width 250 between the sides 244, 246. Optionally, the width 250 may be approximately equal to the length 248. The flexible busbar 140 has a thickness 252 between the upper surface 240 and the lower surface 242. In an exemplary embodiment, the flexible busbar 140 is wide and thin. For example, the width 250 may be at least ten times the thickness 252. As such, the flexible busbar 140 is configured to move and bend as the movable contact 124 is moved between the mated position and the unmated position. The shape of the flexible busbar 140 changes as the movable contact 124 is moved between the mated position and the unmated position.

Figure 6:
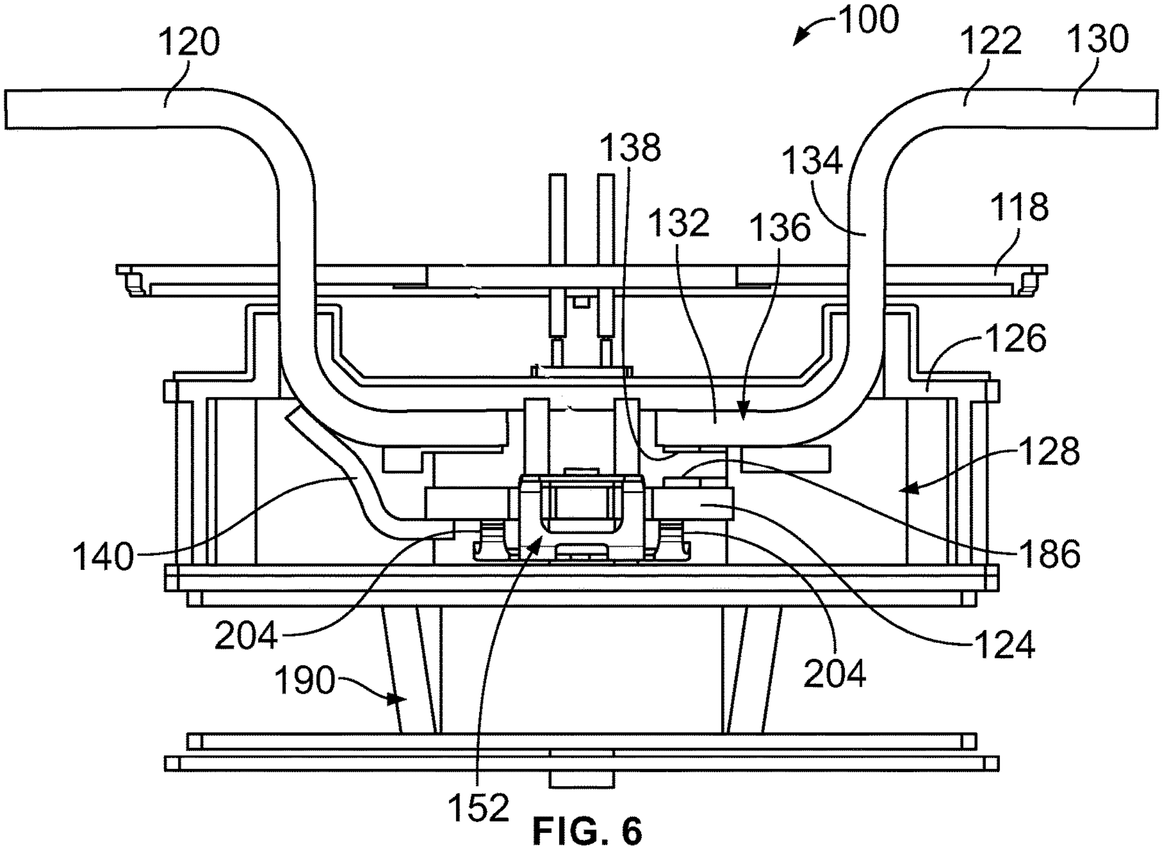
FIG. 6 is a cross-sectional view of a portion of the contactor showing the movable contact in an unmated position with an exemplary embodiment.

FIG. 6 is a cross-sectional view of a portion of the contactor 100 showing the movable contact 124 in an unmated position. The movable contact 124 is spaced apart from the first and second fixed contacts 120, 122 in the unmated position. The flexible busbar 140 extends between the movable contact 124 and the first fixed contact 120.

The contact holder 126 holds the first and second fixed contacts 120, 122. The mating ends 132 of the first and second fixed contacts 120, 122 are located within the enclosure 128 in fixed positions by the contact holder 126. The transition portions 134 of the fixed contacts 120, 122 extend from the contact holder 126 through the cover 118. The terminating ends 130 of the fixed contacts 120, 122 are located at the exterior of the contactor 100, such as for termination to wires or terminals. The contact holder 126 holds the mating ends 132 of the fixed contacts 120, 122 relative to the movable contact 124. The movable contact 124 is movable within the contactor 100 from the unmated position to the mated position. For example, when the coil assembly 190 is activated, the plunger drives the movable contact holder 152 and/or the movable contact 124 upward toward the fixed contacts 120, 122. The flexible busbar 140 moves with the movable contact 124. The mating contact pads 186 are driven into electrical contact with the mating tab pads 138 to complete the circuit.

In an exemplary embodiment, the movable contact holder 152 helps position the movable contact 124 within the contactor 100 as the movable contact 124 is moved to the mated position. For example, the support arms 204 are spring biased against the bottom of the movable contact 124. The support arms 204 are spaced apart from each other to maintain the movable contact 124 in a horizontal orientation. The support arms 204 orient the movable contact 124 parallel to the mating tab 136 to ensure that the mating contact pads 186 engage the mating tab pads 138.

Figure 7:
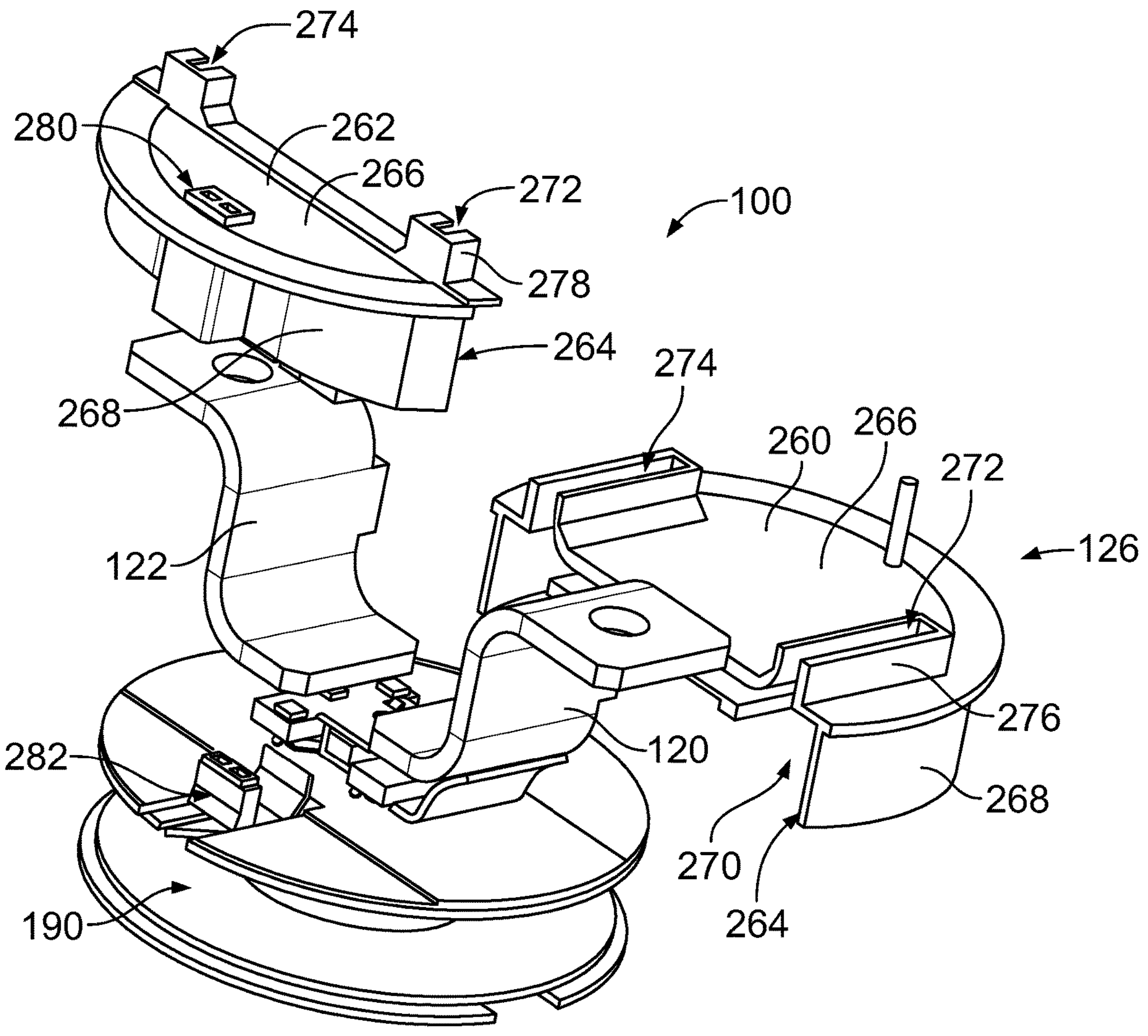
FIG. 7 is a top perspective view of a portion of the contactor showing the contact holder in an exploded state with an exemplary embodiment.
Figure 8:
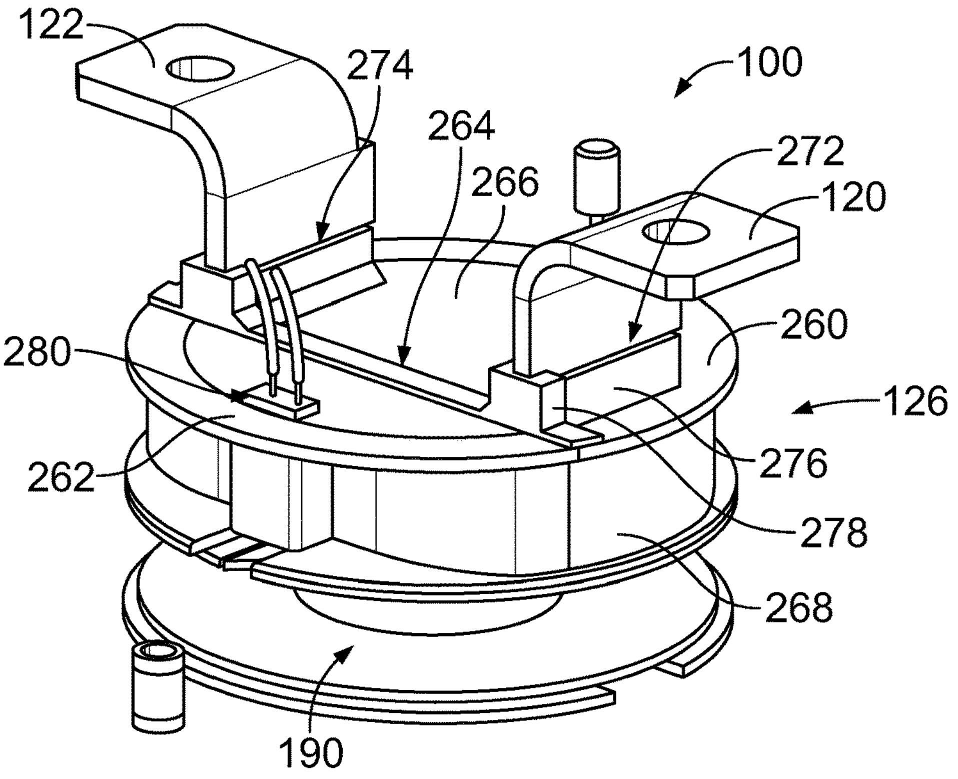
FIG. 8 is a top perspective view of a portion of the contactor showing the contact holder in an assembled state with an exemplary embodiment.

FIG. 7 is a top perspective view of a portion of the contactor 100 showing the contact holder 126 in an exploded state. FIG. 8 is a top perspective view of a portion of the contactor 100 showing the contact holder 126 in an assembled state. In an exemplary embodiment, the contact holder 126 is a multipiece structure. The contact holder 126 may be assembled around the fixed contacts 120, 122. For example, the pieces of the contact holder 126 may be snapped or otherwise coupled together around the fixed contacts 120, 122.

In an exemplary embodiment, the contact holder 126 includes a first holder element 260 and a second holder element 262. The first and second holder elements 260, 262 are coupled together and meet at a seam 264. Optionally, the first and second holder elements 260, 262 may have different sizes, such as the first holder element 260 being larger than the second holder element 262. Alternatively, the first and second holder elements 260, 262 may have similar sizes. Optionally, the first and second holder elements 260, 262 may be mirrored halves. The first and second holder elements 260, 262 coupled together, such as by a snapped coupling or interference fit. Optionally, the first and second holder elements 260, 262 may be secured using latching features, fasteners, or other securing components.

In an exemplary embodiment, the contact holder 126 includes an end wall 266 and a side wall 268 extending from the end wall 266. The seam 264 extends along the end wall 266 and the side wall 268. In the illustrated embodiment, the contact holder 126 is cylindrical; however, the contact holder 126 may have other shapes in alternative embodiments. The end wall 266 is disc-shaped and provided at a top of the contact holder 126. The side wall 268 is ring-shaped and extends from the bottom of the end wall 266 to form a chamber 270 below the end wall 266. In an exemplary embodiment, both the first and second holder elements 260, 262 engage and support both the first and second fixed contacts 120, 122. The first and second fixed contacts 120, 122 pass through the contact holder 126 at the seam 264. The fixed contacts 120, 122 extend into the chamber 270. Optionally, the first and second fixed contacts 120, 122 may be sealed to the first and second holder elements 260, 262, such as where the first and second fixed contacts 120, 120 to pass through the contact holder 126. The sealing may occur inside the chamber 270 or at the exterior of the contact holder 126. The sealing may be provided by gaskets, the epoxy, or other sealing components.

In an exemplary embodiment, the contact holder 126 includes a first channel 272 holding the first fixed contact 120 and a second channel 274 holding the second fixed contact 122. The first holder element 260 forms at least a portion of the first channel 272 and at least a portion of the second channel 274. The second holder element 262 forms at least a portion of the first channel 272 and at least a portion of the second channel 274. The first and second channels 272, 274 span across the seam 264. The first and second holder elements 260, 262 are coupled together around the first and second fixed contacts 120, 122. For example, the first holder element 260 may be side loaded onto both the first and second fixed contacts 120, 122 and/or the second holder element 262 may be side loaded onto both the first and second fixed contacts 120, 122. In various embodiments, assembly may include loading the first and second fixed contacts 120, 122 into the first and second channel portions of the first holder element 260 and then the second holder element 262 is coupled to the first holder element 260 to retain and capture the first and second fixed contacts 120, 122 in the first and second channels 272, 274. In an exemplary embodiment, the first holder element 260 includes shroud walls 276 surrounding the forming channel portions of the first and second channels 272, 274 and the second holder element 262 includes shroud walls 278 surrounding and forming channel portions of the first and second channels 272, 274.

In an exemplary embodiment, the second holder element 262 includes a connector portion 280. The connector portion 280 may hold contacts and/or wires configured to be electrically connected to the coil assembly 190. For example, a coil assembly connector 282 may be plugged into the connector portion 280 when the contact holder 126 is assembled within the contactor 100.

Figure 9:
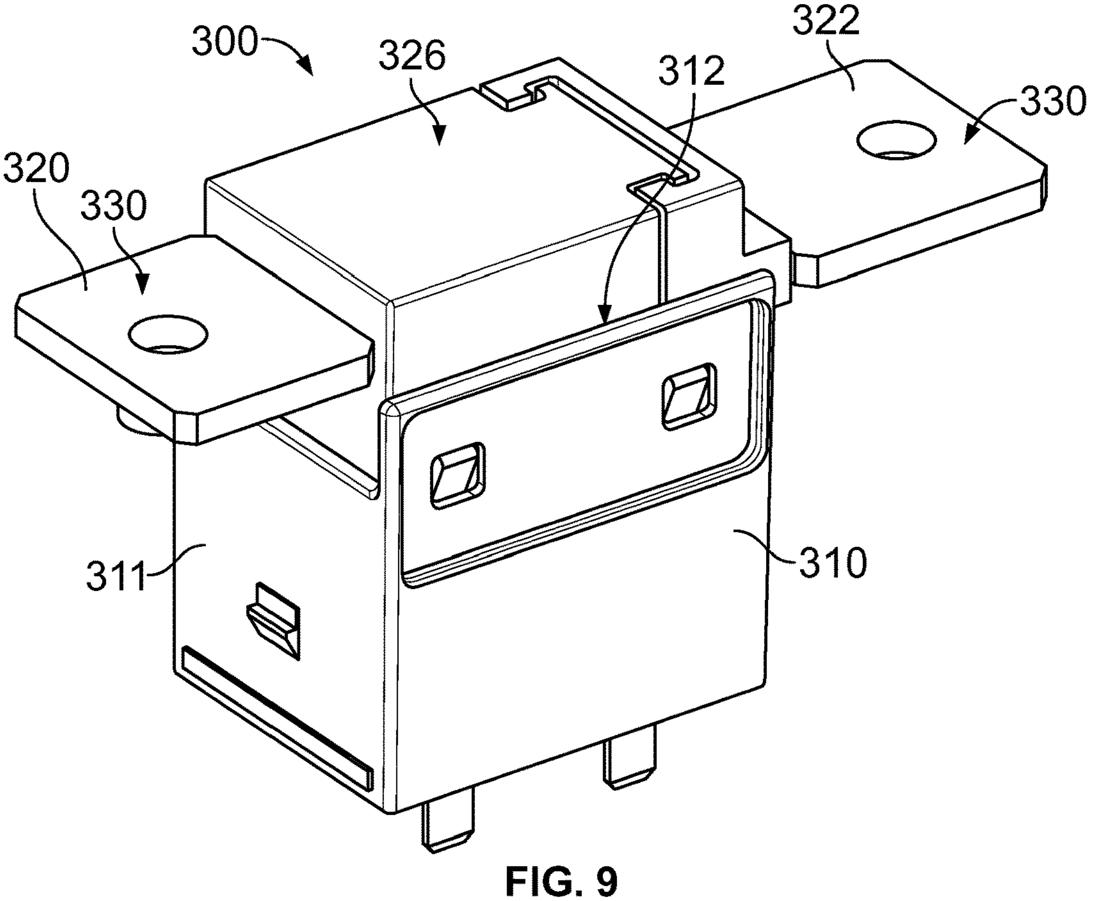
FIG. 9 is a sectional view of the contactor in accordance with an exemplary embodiment.
Figure 10:
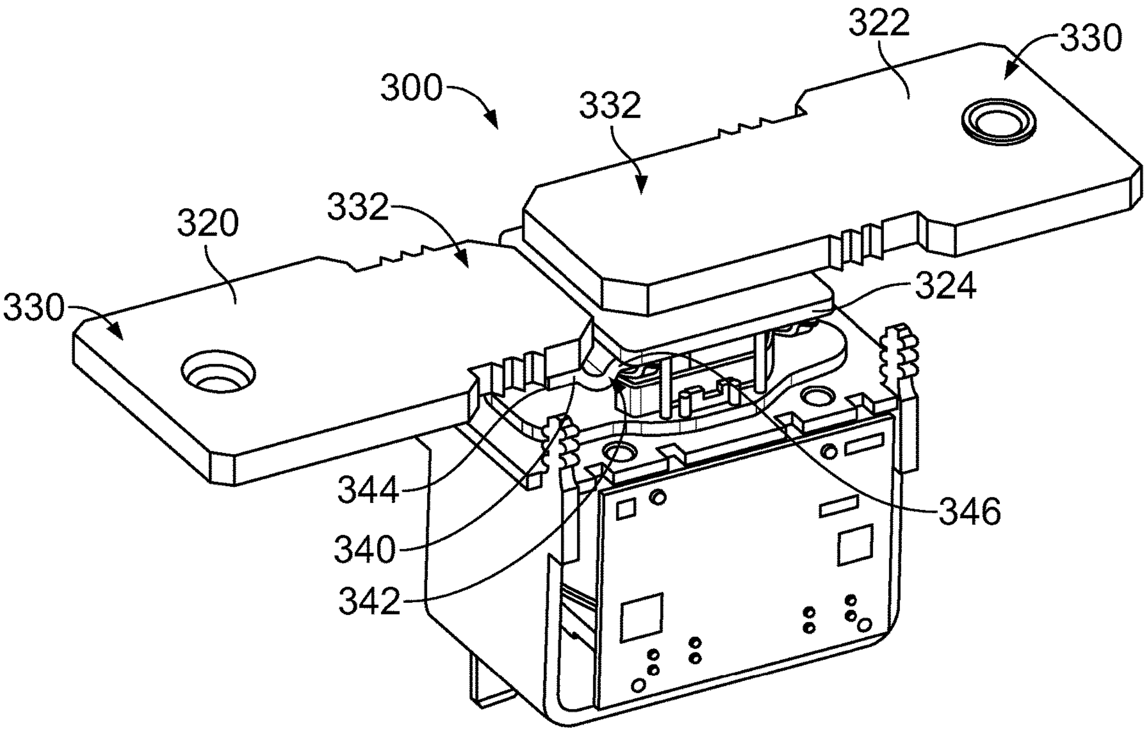
FIG. 10 is a sectional view of the contactor in accordance with an exemplary embodiment illustrating internal components of the contactor.

FIG. 9 illustrates a contactor 300 in accordance with an exemplary embodiment. FIG. 10 is a sectional view of the contactor 300 in accordance with an exemplary embodiment illustrating internal components of the contactor 300. The contactor 300 is similar to the contactor 100; however, the contactor 300 is shaped differently and includes contacts that are shaped differently. The contactor 300 may be an electrical switch or relay.

The contactor 300 includes a housing 310 (removed in FIG. 10 to illustrate the internal components of the contactor 300) having an outer wall 311 surrounding a cavity 312. The housing 310 may be a multi-piece housing in various embodiments. The outer wall 311 may have a rectangular cross-section in various embodiments.

The contactor 300 includes first and second fixed contacts 320, 322, 322 received in the cavity 312 and a movable contact 324 movable within the cavity 312 between a mated position and an unmated position. The movable contact 324 electrically connects the fixed contacts 320, 322 in the mated position. The fixed contacts 320, 322 are fixed to the housing 310. In an exemplary embodiment, a contact holder 326 is used to hold the fixed contacts 320, 322. The contact holder 326 is received in the cavity 312 and coupled to the housing 310.

The fixed contacts 320, 322 each include an outer end defining a terminating end 330 and an inner end defining a mating end 332. In the illustrated embodiment, the fixed contacts 320, 322 are generally planar and may be oriented parallel to each other. Other shapes are possible in alternative embodiments. The terminating end 330 is configured to be terminated to another component, such as a wire or a terminal, such as a line in or a line out wire. In an exemplary embodiment, the terminating end 330 is exposed at the exterior of the contactor 300 for terminating to the other component. In the illustrated embodiment, the terminating end 330 extends to the exterior of the contact holder 326. The mating end 332 is located within the cavity 312 for connection with the movable contact 324. In the illustrated embodiment, the mating end 332 is located inside the contact holder 326.

In an exemplary embodiment, the contactor 300 includes a flexible busbar 340 electrically connecting the first fixed contact 320 and the movable contact 324. The flexible busbar 340 flexes as the movable contact 324 moves between the mated position and the unmated position. In an exemplary embodiment, the flexible busbar 340 includes a flexible braid 342 having braided conductors. A first mating end 344 of the flexible busbar 340 is connected to the first fixed contact 320. A second mating end 346 of the flexible busbar 340 is connected to the movable contact 324. The first and second mating ends 344, 346 may be welded to the first fixed contact 320 and the movable contact 324, respectively. The movable contact 324 remains connected to the first fixed contact 320 through the flexible busbar 340 as the movable contact 324 moves between the mated position and the unmated position. The contactor 300 includes a coil assembly 390 in the cavity 312 operated to move the movable contact 324 between the unmated position and the mated position.

Figure 11:
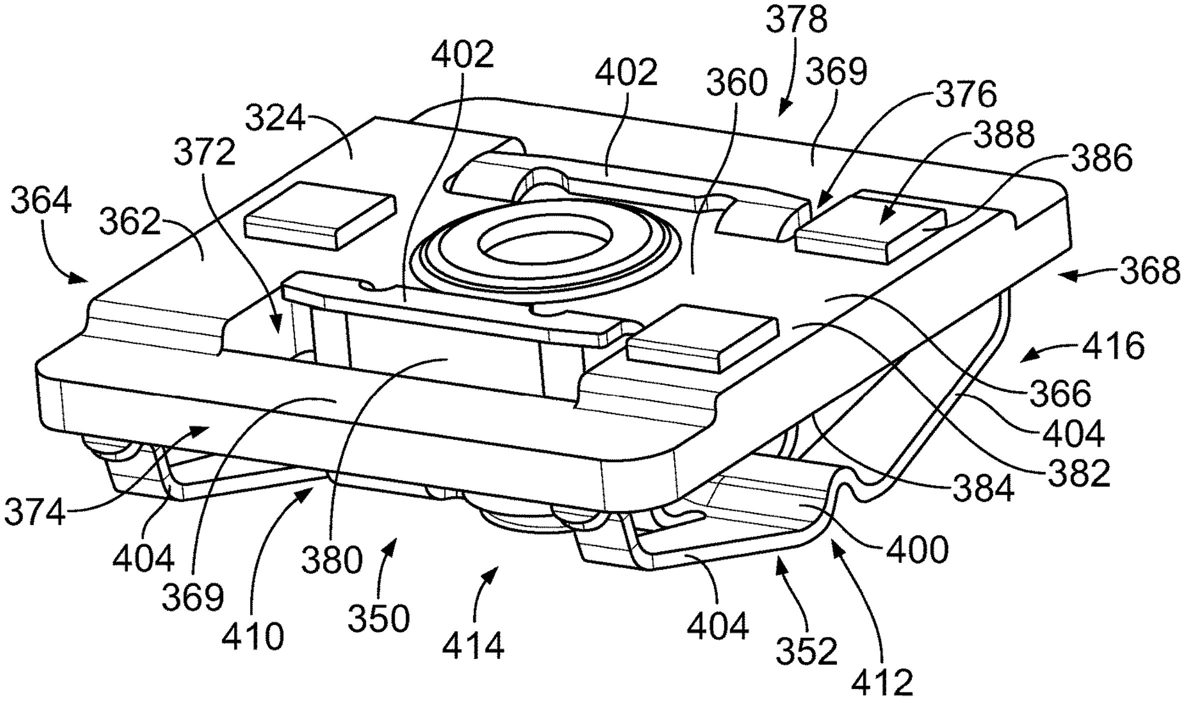
FIG. 11 is a top perspective view of a movable contact assembly in accordance with an exemplary embodiment.

FIG. 11 is a top perspective view of a movable contact assembly 350 in accordance with an exemplary embodiment. The movable contact assembly 350 includes the movable contact 324 and a movable contact holder 352. The movable contact holder 352 is used to position the movable contact 324 in the housing 310 of the contactor 300 (shown in FIG. 9). For example, the movable contact holder 352 may hold the movable contact 324 in a planar orientation, such as a horizontal orientation, as the movable contact 324 moves within the housing 310.

The movable contact 324 is manufactured from a conductive material, such as a metal material. The movable contact 324 includes a main body 360 having a first plate 362 at a first end 364 of the movable contact 324 and a second plate 366 at a second end 368 of the movable contact 324. The movable contact 324 includes connecting beams 369 between the plates 362, 366. The main body 360 may be coupled to the coil assembly 390. The movable contact 324 includes a first pocket 372 along a first side 374 of the movable contact 324 and a second pocket 376 along a second side 378 of the movable contact 324. The movable contact 324 includes mounting tabs 380 extending into the pockets 372, 376. The movable contact holder 352 is coupled to the mounting tabs 380 at the first and second sides 374, 378.

The movable contact 324 includes an upper surface 382 and a lower surface 384. In an exemplary embodiment, the movable contact 324 includes mating contact pads 386 at the upper surface 382. The mating contact pads 386 are configured to be mated to and unmated from the second fixed contact 322. Each mating contact pad 386 includes a mating interface 388 forming the point of contact with the second fixed contact 322. In the illustrated embodiment, the mating interfaces 388 are generally planar. However, the mating contact pads 386 may have other shapes in alternative embodiments, such as being bumps having a convex shape. In an exemplary embodiment, the movable contact 324 includes three of the mating contact pads 386 arranged in a triangular orientation. Greater or fewer mating contact pads 386 may be provided in alternative embodiments. The mating contact pads 386 may be arranged in a different orientation in alternative embodiments. In an exemplary embodiment, the mating contact pads 386 may be located adjacent the perimeter of the movable contact 324 to increase the spacing between the mating contact pads 386.

The movable contact holder 352 includes a base 400, mounting arms 402 extending from the base 400, and support arms 404 extending from the base 400. The mounting arms 402 are used to secure the movable contact holder 352 to the movable contact 324. For example, the mounting arms 402 may be clipped onto the movable contact 324. Other types of mounting features may be used in alternative embodiments. The support arms 404 are used to position the movable contact 324 within the housing 310 of the contactor 300 (shown in FIG. 9) during mating and unmating. In an exemplary embodiment, the support arms 404 are deflectable and configured to be spring biased against the movable contact 324 to hold the movable contact 324 in a particular orientation, such as a horizontal orientation.

The base 400 is provided at the bottom of the movable contact holder 352. The base 400 extends between a first end 410 and a second end 412. The base 400 extends between a first side 414 and a second side 416. In the illustrated embodiment, the movable contact holder 352 includes a pair of the mounting arms 402 provided at the opposite sides 414, 416. In the illustrated embodiment, the movable contact holder 352 includes four of the support arms 404 provided at the opposite ends 410, 412 and the opposite sides 414, 416. The support arms 404 are configured to engage the movable contact 324 at the four corners of the movable contact 324.

When assembled, the mounting arms 402 are secured to the mounting tabs 380 at the first and second sides 374, 378 of the movable contact 324. The support arms 404 are located outward of the mounting arms 402. The support arms 404 engage the lower surface 384 of the movable contact 324 to press upward against the lower surface 384. In an exemplary embodiment, the support arms 404 engage the movable contact 324 proximate to the first and second ends 364, 368 and proximate to the first and second sides 374, 378. For example, the support arms 404 may engage the movable contact 324 proximate to the four outer corners of the movable contact 324. The support arms 404 hold the movable contact 324 in a horizontal orientation as the movable contact 324 moves between the mated position and the unmated position.

Figure 12:
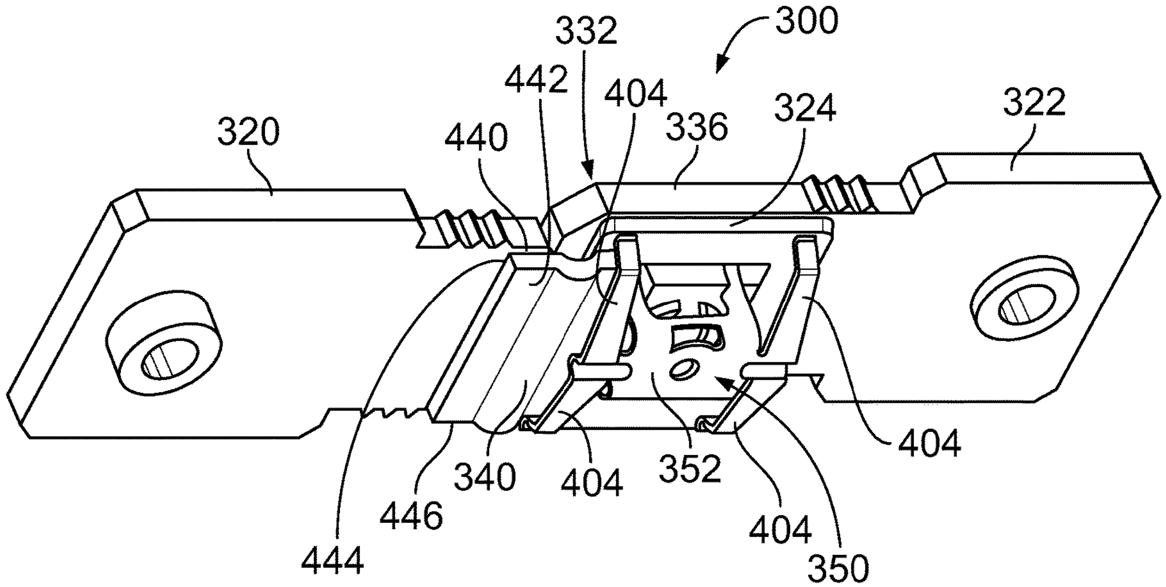
FIG. 12 is a bottom perspective view of a portion of the contactor showing the movable contact assembly in a mated position relative to the fixed contacts with an exemplary embodiment.
Figure 13:
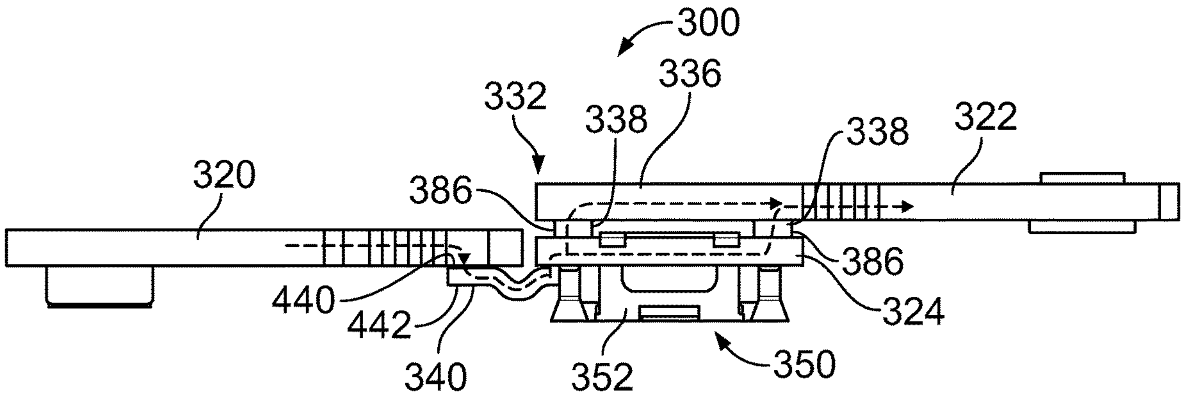
FIG. 13 is a side view of a portion of the contactor showing the movable contact assembly in a mated position relative to the fixed contacts with an exemplary embodiment.

FIG. 12 is a bottom perspective view of a portion of the contactor 300 showing the movable contact assembly 350 in a mated position relative to the fixed contacts 320, 322. FIG. 13 is a side view of a portion of the contactor 300 showing the movable contact assembly 350 in a mated position relative to the fixed contacts 320, 322. FIGS. 12 and 13 illustrate the flexible busbar 340 between the first fixed contact 320 and the movable contact 324. The movable contact 324 is mated to the second fixed contact 322.

In an exemplary embodiment, the second fixed contact 322 includes a mating tab 336 at the mating end 332. The mating tab 336 is oriented parallel to the movable contact 324. For example, the mating tab 336 may be oriented horizontally. The second fixed contact 322 includes one or more mating tab pads 338 (FIG. 13) at a bottom of the mating tab 336. The mating tab pads 338 are configured to be mated to and unmated from the mating contact pads 386 (FIG. 13) of the movable contact 324. Electrical paths are created between the movable contact 324 and the second fixed contact 322 through the mating contact pads 386 and the mating tab pads 338. Providing multiple mating contact pads 386 and mating tab pads 338 creates multiple points of contact and multiple electrical paths through the second fixed contact 322 and the movable contact 324. For example, parallel electrical paths may be created, such as a first electrical path through the second fixed contact 322 and a second electrical path through the movable contact 324. The parallel electrical paths generate a magnetically attractive force, which tends to hold the movable contact 324 in the mated position and reduces the risk of undesirable separation or vibrations in the contacts.

The flexible busbar 340 forms a permanent connection between the movable contact 324 and the first fixed contact 320. The flexible busbar 340 is connected to the movable contact 324 and the first fixed contact 320 in the mated position and the flexible busbar 340 is connected to the movable contact 324 and the first fixed contact 320 in the unmated position. When unmated, the movable contact 324 is separated from the second fixed contact 322.

In an exemplary embodiment, the flexible busbar 340 has a generally rectangular cross-section. For example, the flexible busbar 340 is plate-like or sheet-like having an upper surface 440 and a lower surface 442 extending between first and second sides 444, 446 (FIG. 12). The sides 444, 446 extend between the first and second mating ends 344, 346. The flexible busbar 340 has a length between the mating ends 344, 346 and a width between the sides 444, 446. Optionally, the width may be approximately equal to the length. The flexible busbar 340 has a thickness between the upper surface 440 and the lower surface 442. In an exemplary embodiment, the flexible busbar 340 is wide and thin. For example, the width may be at least ten times the thickness. As such, the flexible busbar 340 is configured to move and bend as the movable contact 324 is moved between the mated position and the unmated position. The shape of the flexible busbar 340 changes as the movable contact 324 is moved between the mated position and the unmated position.

Figure 14:
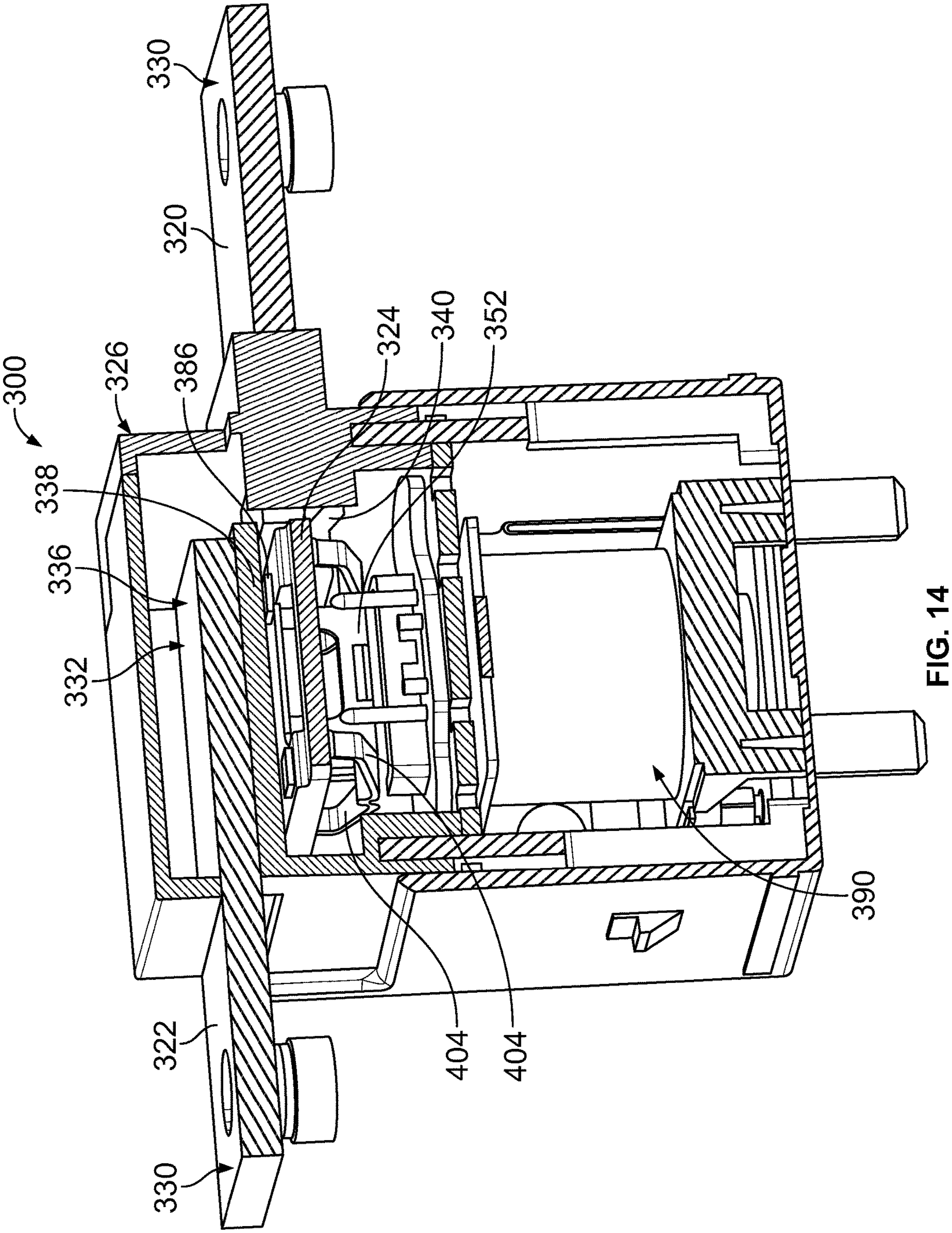
FIG. 14 is a cross-sectional view of a portion of the contactor showing the movable contact in an unmated position with an exemplary embodiment.

FIG. 14 is a cross-sectional view of a portion of the contactor 300 showing the movable contact 324 in an unmated position. The movable contact 324 is spaced apart from the first and second fixed contacts 320, 322 in the unmated position. The flexible busbar 340 extends between the movable contact 324 and the first fixed contact 320.

The contact holder 326 holds the first and second fixed contacts 320, 322. The mating ends 332 of the first and second fixed contacts 320, 322 are located within the interior of the contact holder 326 in fixed positions by the contact holder 326. The terminating ends 330 of the fixed contacts 320, 322 are located at the exterior of the contactor 300, such as for termination to wires or terminals. The contact holder 326 holds the mating ends 332 of the fixed contacts 320, 322 relative to the movable contact 324. The movable contact 324 is movable within the contactor 300 from the unmated position to the mated position. For example, when the coil assembly 390 is activated, movable contact holder 352 and/or the movable contact 324 is driven upward toward the fixed contacts 320, 322. The flexible busbar 340 moves with the movable contact 324. The mating contact pads 386 are driven into electrical contact with the mating tab pads 338 to complete the circuit.

In an exemplary embodiment, the movable contact holder 352 helps position the movable contact 324 within the contactor 300 as the movable contact 324 is moved to the mated position. For example, the support arms 404 are spring biased against the bottom of the movable contact 324. The support arms 404 are spaced apart from each other to maintain the movable contact 324 in a horizontal orientation. The support arms 404 orient the movable contact 324 parallel to the mating tab 336 to ensure that the mating contact pads 386 engage the mating tab pads 338.

Figure 15:
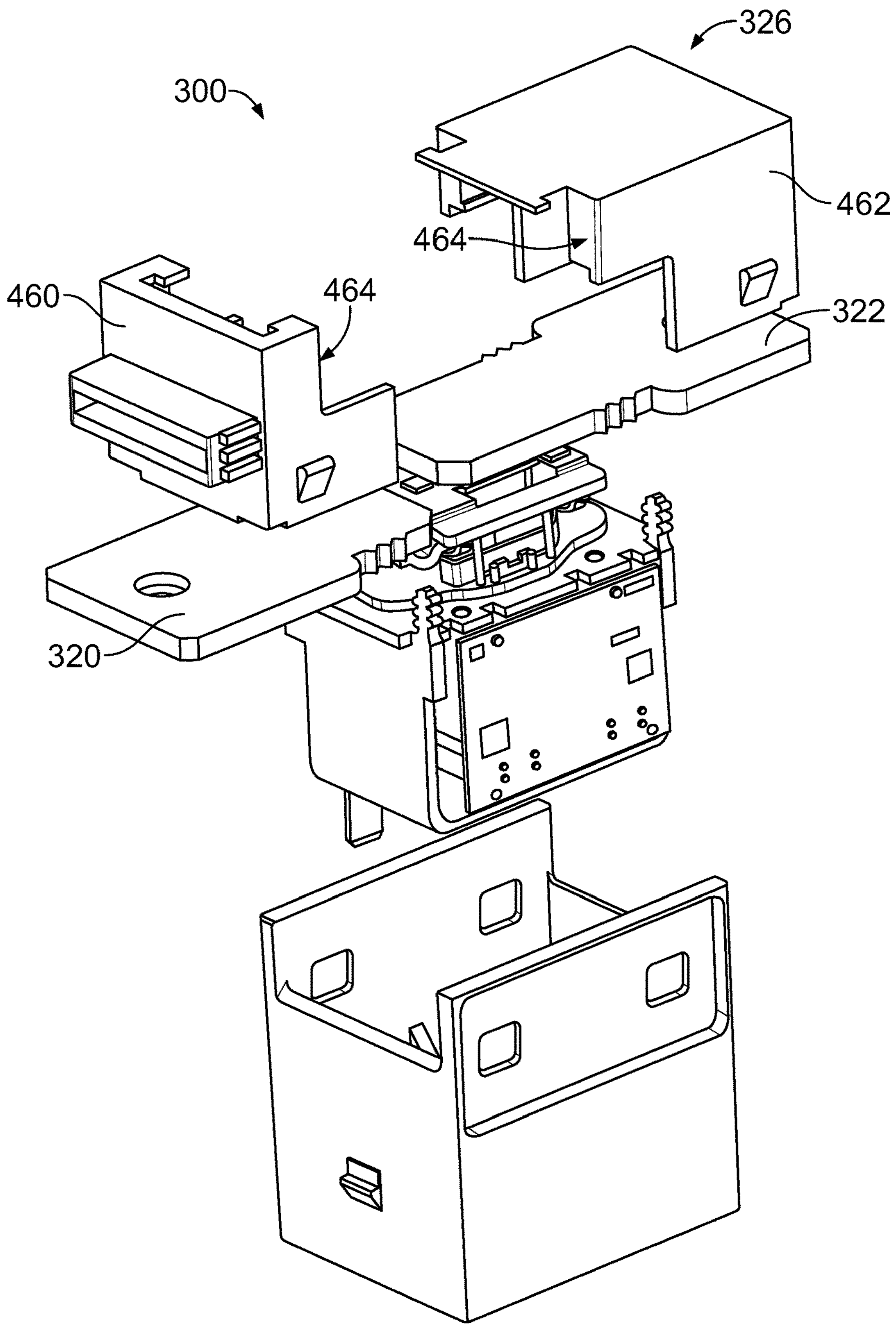
FIG. 15 is an exploded view of the contactor in an exemplary embodiment.

FIG. 15 is an exploded view of the contactor 300 in an exemplary embodiment. In an exemplary embodiment, the contact holder 326 is a multipiece structure. The contact holder 326 may be assembled around the fixed contacts 320, 322. For example, the pieces of the contact holder 326 may be snapped or otherwise coupled together around the fixed contacts 320, 322. In an exemplary embodiment, the contact holder 326 includes a first holder element 460 and a second holder element 462. The first and second holder elements 460, 462 are coupled together and meet at a seam 464. The first and second holder elements 460, 462 coupled together, such as by a snapped coupling or interference fit. Optionally, the first and second holder elements 460, 462 may be secured using latching features, fasteners, or other securing components. In the illustrated embodiment, the contact holder 326 is rectangular; however, the contact holder 326 may have other shapes in alternative embodiments.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A contactor comprising:

a housing having an outer wall defining a cavity;

a first fixed contact coupled to the housing, the first fixed contact having a first mating end received in the cavity and a first terminating end outside of the housing, the first mating end oriented along a first plane;

a second fixed contact coupled to the housing, the second fixed contact having a second mating end received in the cavity and a second terminating end outside of the housing, the second mating end oriented along the first plane;

a movable contact oriented parallel to the first plane, the movable contact movable within the cavity between a mated position and an unmated position, the movable contact engaging the second mating end in the mated position, the movable contact separated from the second fixed contact in the unmated position;

a flexible busbar coupled to the first mating end and coupled to the movable contact, the flexible busbar electrically connecting the first fixed contact and the movable contact in both the mated position and the unmated position; and a coil assembly in the cavity operated to move the movable contact between the unmated position and the mating position.

2. The contactor of claim 1, wherein the second mating end includes a mating tab, the mating tab having a first mating tab pad and a second mating tab pad spaced apart from the first mating tab pad, the movable contact engaging the first and second mating tab pads of the second fixed contact in the mated position to create a first electrical path between the first and second mating tab pads through the movable contact and a second electrical path between the first and second mating tab pads through the second fixed contact.

3. The contactor of claim 1, further comprising a movable contact holder coupled to the movable contact, the movable contact holder including support arms engaging the movable contact to hold the movable contact parallel to a mating tab of the second fixed contact.

4. The contactor of claim 1, further comprising a contact holder received in the cavity, the contact holder holding the first and second fixed contacts within the housing, the contact holder including a first holder element and a second holder element meeting at a seam, the first and second fixed contacts passing through the contact holder at the seam such that both the first and second holder elements engage and support the first and second fixed contacts.

5. The contactor of claim 4, wherein the contact holder includes a first channel holding the first fixed contact and a second channel holding the second fixed contact, the first holder element forming at least a portion of the first channel and at least a portion of the second channel, the second holder element forming at least a portion of the first channel and at least a portion of the second channel.

6. The contactor of claim 4, wherein the contact holder includes an end wall and a side wall forming a chamber, the first and second fixed contacts extending into the chamber, the seam extending along the end wall and along the side wall.

7. The contactor of claim 1, wherein the flexible busbar includes a flexible braid.

8. The contactor of claim 1, wherein the flexible busbar includes a first mating end and a second mating end, the first mating end of the flexible busbar coupled to the first fixed contact, the second mating end of the flexible busbar coupled to the movable contact, the second mating end of the flexible busbar movable relative to the first mating end of the flexible busbar as the mating contact moves between the mated position and the unmated position.

9. The contactor of claim 1, wherein the flexible busbar is welded to the first fixed contact to create a fixed connection with the first fixed contact, the flexible busbar being welded to the movable contact to create a fixed connection with the movable contact.

10. The contactor of claim 1, wherein the flexible busbar has a width between opposite first and second sides and a thickness between opposite upper and lower surfaces, the width being at least ten times the thickness.

11. The contactor of claim 1, wherein the contactor includes an electrical path between the first and second fixed contacts through the flexible busbar and the movable contact when the movable contact is in the mated position, the electrical path having a single separable interface at the interface between the movable contact and the second fixed contact.

12. A contactor comprising:

a housing having an outer wall defining a cavity;

a first fixed contact coupled to the housing, the first fixed contact having a first mating end received in the cavity and a first terminating end outside of the housing, the first mating end oriented along a first plane;

a second fixed contact coupled to the housing, the second fixed contact having a second mating end received in the cavity and a second terminating end outside of the housing, the second mating end oriented along the first plane, the second mating end having a mating tab, the second fixed contact having a first mating tab pad and a second mating tab pad spaced apart from the first mating tab pad on the mating tab;

a movable contact oriented parallel to the first plane, the movable contact movable within the cavity between a mated position and an unmated position, the movable contact separated from the second fixed contact in the unmated position, the movable contact engaging the first and second mating tab pads of the second fixed contact in the mated position to create a first electrical path between the first and second mating tab pads through the movable contact and a second electrical path between the first and second mating tab pads through the second fixed contact;

a flexible busbar coupled to the first mating end and coupled to the movable contact, the flexible busbar electrically connecting the first fixed contact and the movable contact in both the mated position and the unmated position; and a coil assembly in the cavity operated to move the movable contact between the unmated position and the mating position.

13. The contactor of claim 12, wherein the movable contact includes a mating end facing the mating tab, the mating tab being parallel to the mating end of the movable contact.

14. The contactor of claim 12, further comprising a movable contact holder coupled to the movable contact, the movable contact holder coupled to the coil assembly and movable by the coil assembly with the movable contact between the mated position and the unmated position.

15. The contactor of claim 14, wherein the movable contact holder includes support arms, the support arms engaging the movable contact at a first end of the movable contact and engaging the movable contact at a second end of the movable contact.

16. The contactor of claim 15, wherein the support arms engage the movable contact at a first side of the movable contact and engage the movable contact at a second side of the movable contact.

17. The contactor of claim 14, wherein the movable contact holder holds the movable contact parallel to the mating tab of the second fixed contact.

18. The contactor of claim 12, wherein the second fixed contact includes a third mating tab pad, the first mating tab pad, the second mating tab pad, and the third mating tab pad having a triangulated orientation.

19. The contactor of claim 12, wherein the movable contact includes a first mating contact pad aligned with the first mating tab pad and engaging the first mating tab pad in the mated position, the movable contact including a second movable contact pad aligned with the second mating tab pad and engaging the second mating tab pad in the mated position.

20. A contactor comprising:

a housing having an outer wall defining a cavity;

a first fixed contact coupled to the housing, the first fixed contact having a first mating end received in the cavity and a first terminating end outside of the housing;

a second fixed contact coupled to the housing, the second fixed contact having a second mating end received in the cavity and a second terminating end outside of the housing;

a contact holder received in the cavity, the contact holder holding the first and second fixed contacts within the housing, the contact holder including a first holder element and a second holder element meeting at a seam, the first and second fixed contacts passing through the contact holder at the seam such that both the first and second holder elements engage and support the first and second fixed contacts;

a movable contact movable within the cavity between a mated position and an unmated position, the movable contact electrically connecting the first and second fixed contacts in the mated position, the movable contact separated from the second fixed contact in the unmated position; and a coil assembly in the cavity operated to move the movable contact between the unmated position and the mating position.

21. The contactor of claim 20, wherein the contact holder includes a first channel holding the first fixed contact and a second channel holding the second fixed contact, the first holder element forming at least a portion of the first channel and at least a portion of the second channel, the second holder element forming at least a portion of the first channel and at least a portion of the second channel.

22. The contactor of claim 20, wherein the contact holder includes an end wall and the side wall forming a chamber, the first and second fixed contacts extending into the chamber, the seam extending along the end wall and the side wall.

* * * * *